United States Patent [19]

Kuznicki

[11] Patent Number: 5,282,205
[45] Date of Patent: Jan. 25, 1994

[54] DATA COMMUNICATION TERMINAL PROVIDING VARIABLE LENGTH MESSAGE CARRY-ON AND METHOD THEREFOR

[75] Inventor: William J. Kuznicki, Coral Springs, Fla.

[73] Assignee: Motorola, Inc., Schaumburg, Ill.

[21] Appl. No.: 891,503

[22] Filed: May 29, 1992

[51] Int. Cl.⁵ .......................... H04J 3/16; H04Q 7/00; G08B 5/22
[52] U.S. Cl. ................................. 370/94.1; 370/95.1; 340/825.06; 340/825.44; 379/57
[58] Field of Search ..................... 370/84, 94.1, 95.1, 370/95.2, 95.3, 94.2, 110.1, 82; 340/825.44, 825.47, 825.48, 825.06; 379/57, 58, 59, 63; 455/38.1, 38.5

[56] References Cited

U.S. PATENT DOCUMENTS

| | | | |
|---|---|---|---|
| 4,642,632 | 2/1987 | Ohyagi et al. | 340/825.44 |
| 4,947,420 | 8/1990 | Stahl et al. | 379/57 |
| 5,072,444 | 12/1991 | Breeden et al. | 370/95.1 |
| 5,109,220 | 4/1992 | Breeden et al. | 379/57 |

*Primary Examiner*—Douglas W. Olms
*Assistant Examiner*—Alpus H. Hsu
*Attorney, Agent, or Firm*—Philip P. Macnak; Thomas G. Berry; Daniel R. Collopy

[57] ABSTRACT

A data communication terminal (102) transmits messages to a plurality of data communication receivers (106), and has an input for receiving messages and assigning the same into a plurality of transmission frames which are assigned for transmission to the plurality data communication receivers. The data communication terminal (102) comprises a first memory (210) for storing the received messages, a timer (214) for generating periodic timing signals, a controller (204) responsive to the periodic timing signals, for recovering the stored messages and queueing the same into a second memory (1910) having a predetermined transmission frame queue capacity. A monitoring circuit (1902, 1908) monitors the transmission frame queue capacity of the second memory (1910), and expected transmission frame queue capacities for one or more subsequent transmission frames. The monitoring circuit (1902, 1908) determines when the messages stored within the second memory (1910) will exceed the predetermined transmission frame queue capacity, and enables the storage of the excess messages in a third memory (1912). A frame batching controller (1902) generates designating information designating one or more of the subsequent transmission frames during which the excess messages stored are to be transmitted. A transmitter (104) transmits the messages and designating information stored in the second memory (1910) within the assigned transmission frame, and transmits the excess messages stored in the third memory (1912) within the one or more of the subsequent transmission frames designated by the designating information.

19 Claims, 13 Drawing Sheets

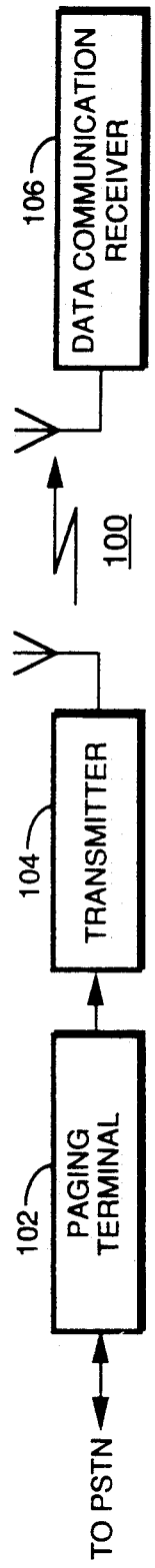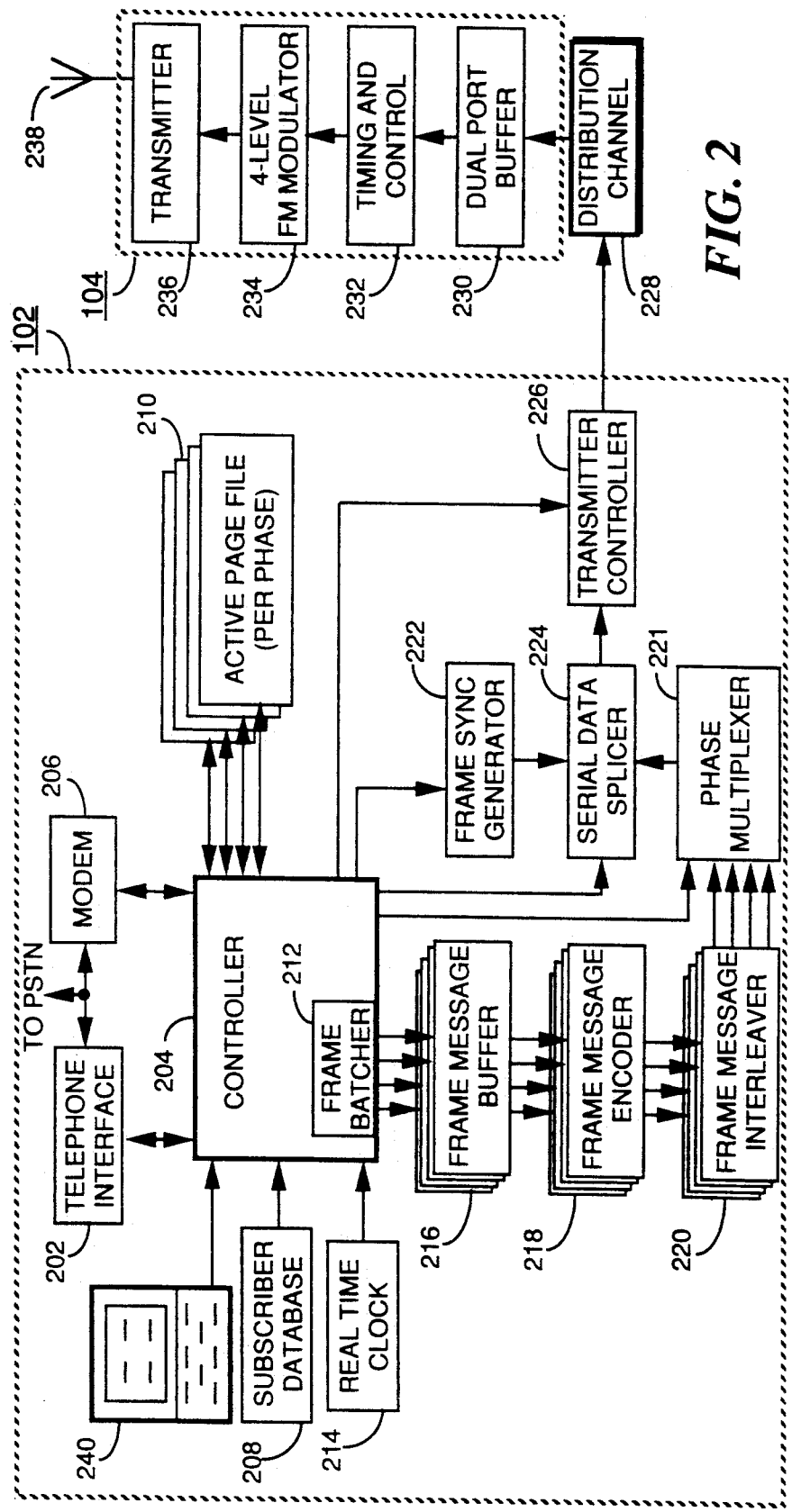

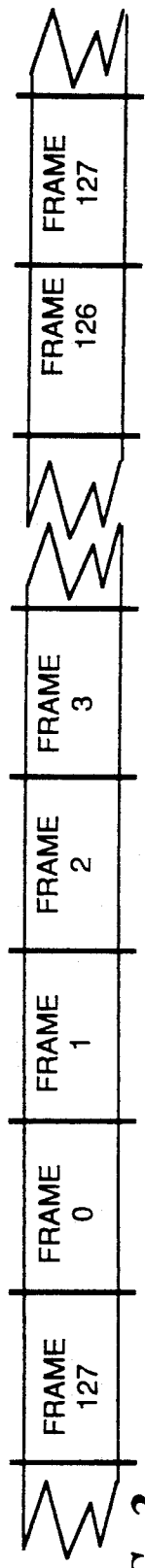
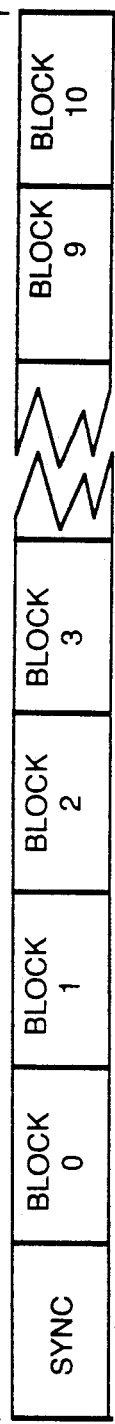
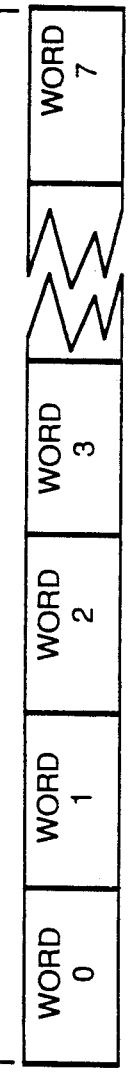
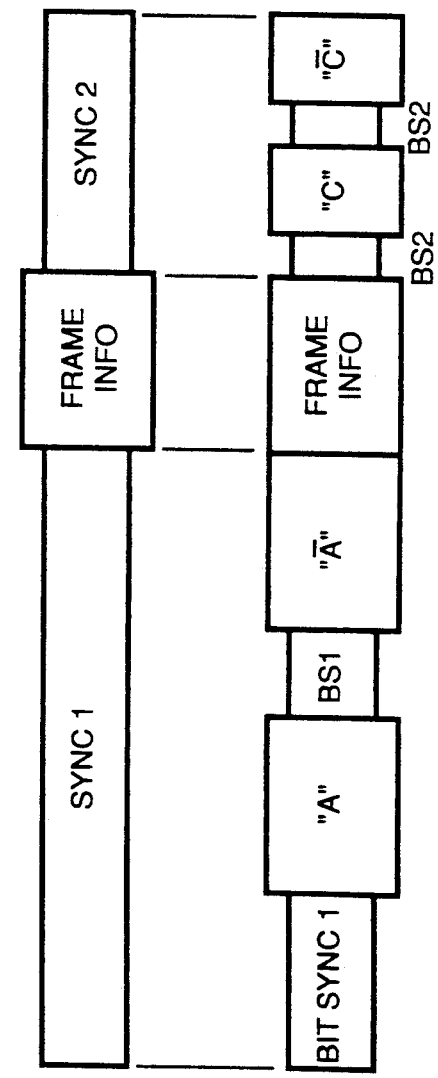
FIG. 3
FIG. 4
FIG. 5
FIG. 6
FIG. 7

DATA COMMUNICATION TERMINAL PROVIDING VARIABLE LENGTH MESSAGE CARRY-ON AND METHOD THEREFOR

CROSS REFERENCE TO RELATED COPENDING APPLICATION

A related, copending application is U.S. Pat. application Ser. No. 07/891,363, filed concurrently herewith, by Schwendeman et al., and assigned to the assignee hereof, entitled "Data Communication Receiver Having Variable Length Message Carry-On".

BACKGROUND OF THE INVENTION

1. Field of the Invention

The present invention relates generally to the field of data communication receivers, and more particularly to a data communication receiver having variable length message carry-on.

2. Description of the Prior Art

There are many data communications systems in operation today which provide message distribution to data communication receivers, such as pagers. Many of these system utilize signaling protocols which utilize time slots, or transmission frames, to which the pagers are assigned, thereby providing a battery saving function during the normal course of message transmission. A paging terminal was provided in such systems to encode the received messages for transmission to the intended pagers during the assigned transmission frames. In signaling protocols such as the POCSAG signaling protocol, each time slot, or transmission frame, allowed for the transmission of only two code words, either both address code words, an address and a message code word, or two message code words. Since the transmission of even a simple telephone number required as a minimum two message code words, numeric message transmissions required on the average one and one-half frames, which periodically resulted in the inability to transmit address code words during the assigned transmission frames, because the transmission frame was filled by message code words associated with address code words transmitted in the previous transmission frame.

The above problem was alleviated in some signaling protocols by increasing the number of code words which could be transmitted in any transmission frame. However, when the number of transmittable code words is selected for the transmission frames, such transmission frames often have to be filled with idle code words when an insufficient number of messages have been received for transmission during any particular transmission frame. Such signaling protocols were also limited in the number of data communication receivers, or pagers, which could be assigned, or operated on any given channel, before the channel reached its maximum capacity. By increasing the transmission speed, additional pagers could be added to the system, however at the expense of a significant amount of unused channel capacity, until the system again filled up. There is a need to be able to provide a flexible system which enables reconfiguring the amount of information which can be transmitted on the channel within the available transmission frames in order to maximize message throughput on the channel.

SUMMARY OF THE INVENTION

In accordance with one aspect of the present invention, a data communication terminal for transmitting messages to a data communication receiver comprises a receiver for receiving messages directed to the data communication receiver, a device for assigning the received messages into at least one of a plurality of transmission frames corresponding to a transmission frame assigned to the data communication receiver for receiving messages, a first memory for storing the received messages and identifying the same with transmission frame assignment information, a device, responsive to the transmission frame assignment information, for recovering the stored messages and for queueing the same into a transmission frame buffer having a predetermined queue capacity, a monitor for monitoring the transmission frame buffer queue capacity, and expected transmission frame buffer queue capacities for one or more subsequent transmission frames. The monitor also determines when the messages stored within the transmission frame buffer exceed the predetermined transmission frame queue capacity, and when the expected transmission frame buffer queue capacities for the one or more subsequent transmission frames do not exceed the predetermined transmission frame queue capacity. A designating device, responsive to the monitor, designates one or more subsequent transmission frames having excess transmission frame buffer queue capacity for message transmission, and generates designating information corresponding thereto. A transmitter transmits the messages and designating information within the assigned transmission frame, and transmits the excess messages within the one or more subsequent transmission frames designated by the designating information.

A method for queueing messages for transmission in a data communication terminal having an input for receiving messages and for assigning the same into a plurality of transmission frames assigned for transmission to a plurality of data communication receivers comprises the steps of storing the received messages in a first memory, generating periodic timing signals, recovering the stored messages from the first memory in response to the periodic timing signals being generated, queueing the recovered messages for the assigned transmission frame into a second memory having a predetermined queue capacity, monitoring the second memory queue capacity, and expected queue capacities for one or more subsequent transmission frames, determining when the messages stored within the second memory exceed the predetermined queue capacity, storing the excess messages recovered in a third memory, generating designating information designating one or more subsequent transmission frames during which the excess messages stored in the third memory are to be transmitted, transmitting the messages and designating information stored in the second memory within the assigned transmission frame, and transmitting the excess messages stored in the third memory within the one or more subsequent transmission frames designated by the designating information.

BRIEF DESCRIPTION OF THE DRAWINGS

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIGS. 3-5 are timing diagrams illustrating the transmission format of the signaling protocol utilized in accordance with the preferred embodiment of the present invention.

FIGS. 6 and 7 are timing diagrams illustrating the synchronization signals utilized in accordance with the preferred embodiment of the present invention.

DESCRIPTION OF THE PREFERRED EMBODIMENTS

Figure 8:
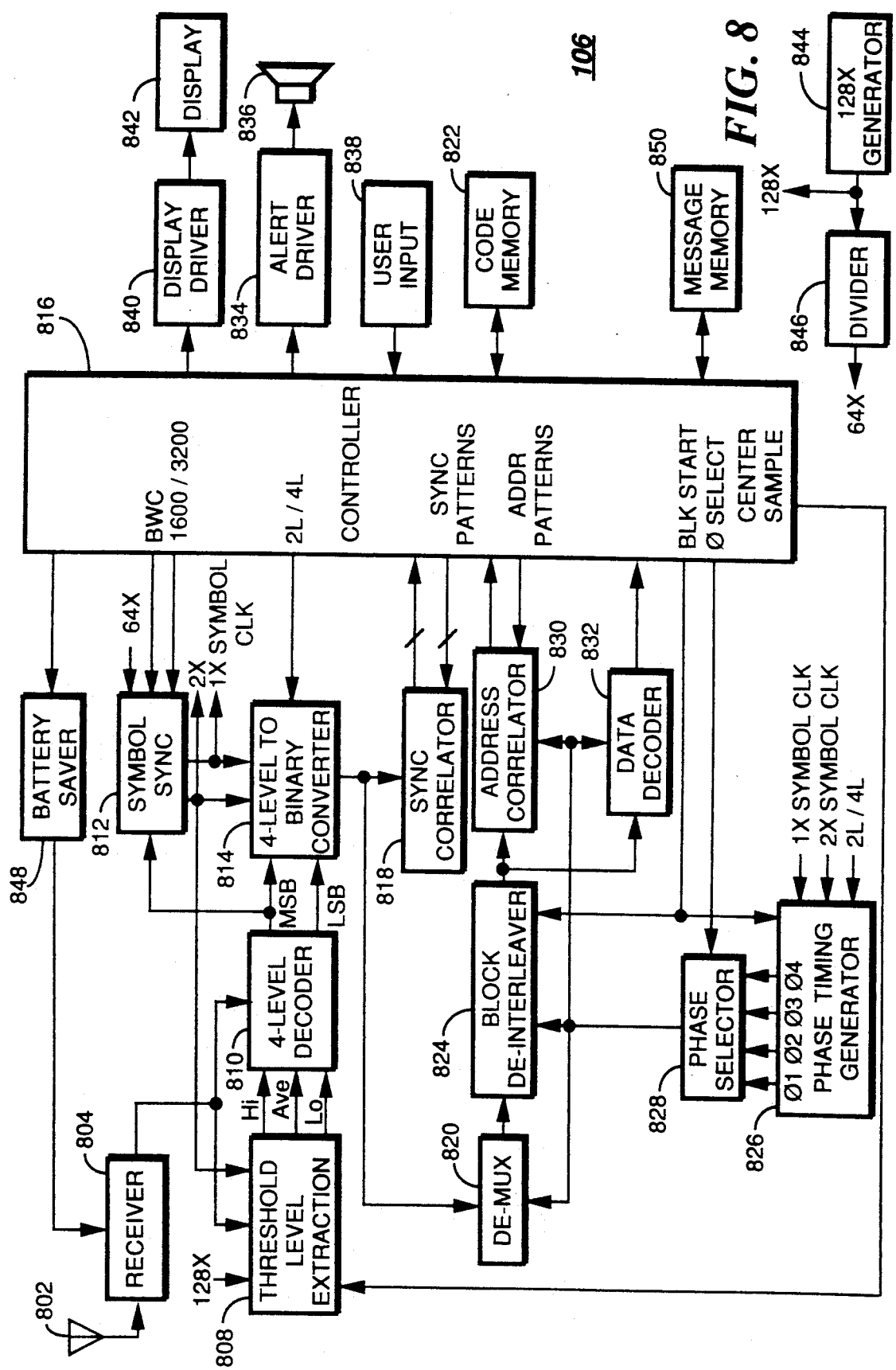
FIG. 8 is an electrical block diagram of a data communication receiver in accordance with the preferred embodiment of the present invention.

FIG. 1 is an electrical block diagram of a data transmission system 100, such as a paging system, in accordance with the preferred embodiment of the present invention In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104 preferably simulcast transmit the message information to data communication receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone are coupled to the paging terminal 102 through a telephone interface 202 in a manner well known in the art. Longer messages, such as alphanumeric messages which require the use of a data entry device are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the data communication receiver, message type associated with the address, and information related to the status of the data communication receiver, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the data communication receiver is assigned, as will be described in further detail below. The received message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batcher 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5. each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words which utilize the first code word bit to define the code word type, as either address or data, no such distinction is provided for the address and data code words in the signaling protocol utilized with the preferred embodiment of the present invention. Rather, address and data code words are defined by their position within the individual frames.

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
|---|---|
| 1600 bps | A1 and A1 bar |
| 3200 bps | A2 and A2 bar |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

FIG. 8 is an electrical block diagram of the data communication receiver 106 in accordance with the preferred embodiment of the present invention. The heart of the data communication receiver 106 is a controller 816, which is preferably implemented using an MC68HC05HC11 microcomputer, such as manufactured by Motorola, Inc. The microcomputer controller, hereinafter call the controller 816, receives and processes inputs from a number of peripheral circuits, as shown in FIG. 8, and controls the operation and interaction of the peripheral circuits using software subroutines. The use of a microcomputer controller for processing and control functions is well known to one of ordinary skill in the art.

Figure 9:
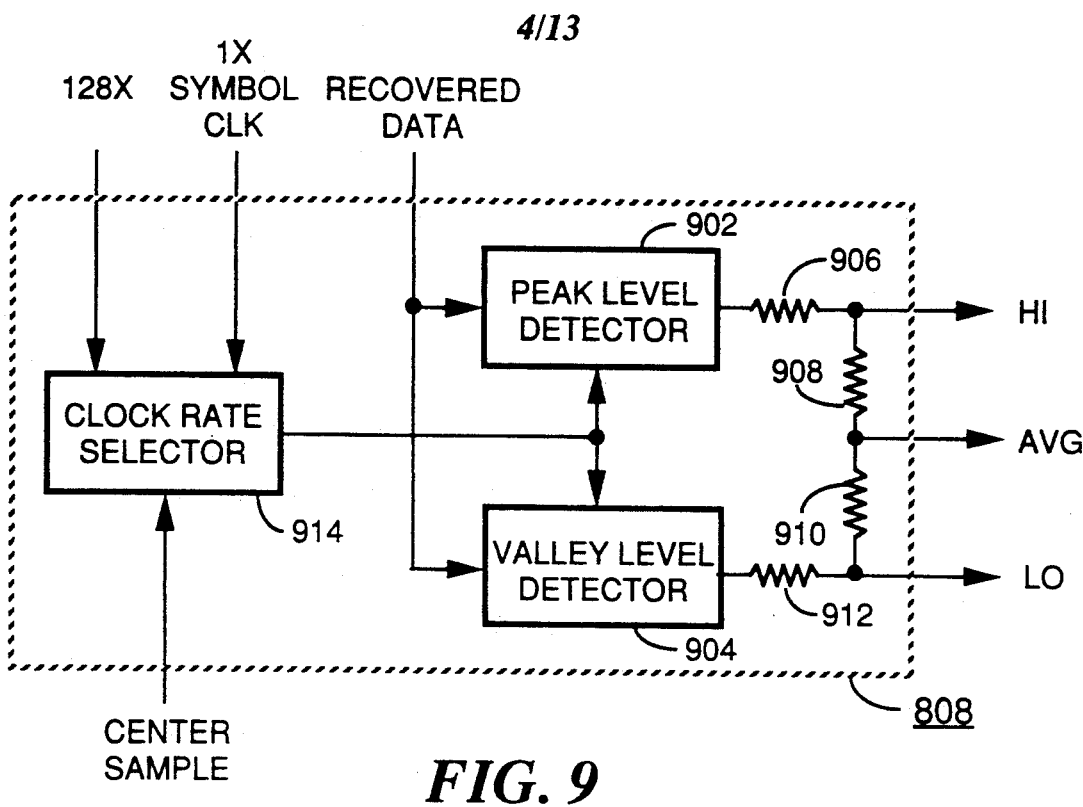
FIG. 9 is an electrical block diagram of a threshold level extraction circuit utilized in the data communication receiver of FIG. 8.

The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810. The threshold level extraction circuit 808 is best understood by referring to FIG. 9, and as shown comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The level detector 902, 904 signal outputs are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128X clock, i.e. a clock having a frequency equivalent to 128 times the slowest data bit rate, which as described above is 1600 bps. The 128X clock is generated by 128X clock generator 844, as shown in FIG. 8, which is preferably a crystal controlled oscillator operating at 204.8 KHz (kilohertz). The output of the 128X clock generator 844 couples to an input of frequency divider 846 which divides the output frequency by two to generate a 64X clock at 102.4 KHz. Returning to FIG. 9, the 128X clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1X symbol clock which is generated by symbol synchronizer 812 as shown in FIG. 8.

Figure 10:
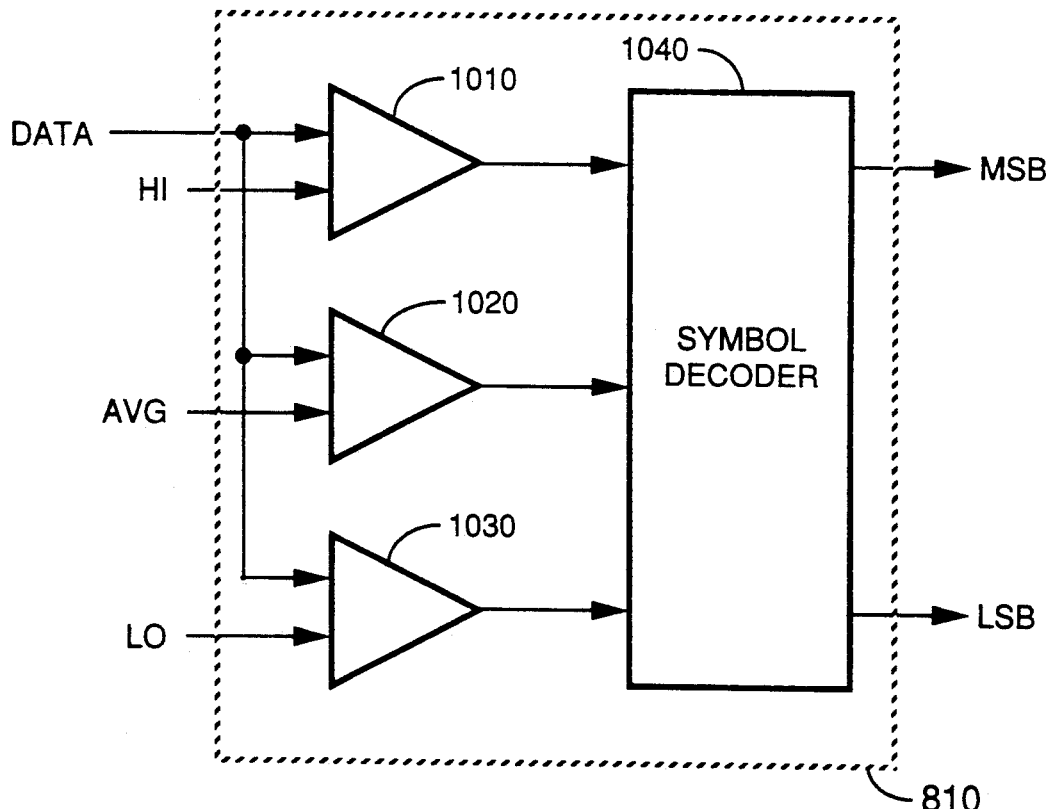
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
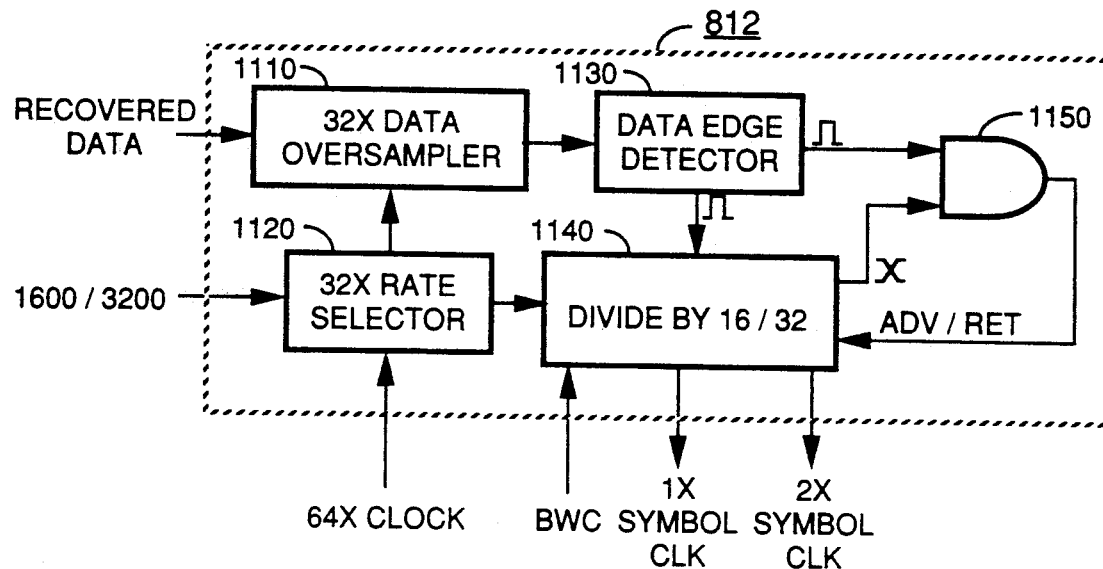
FIG. 11 is an electrical block diagram of a symbol synchronizer utilized in the data communication receiver of FIG. 8.

The operation of the symbol synchronizer 812 is best understood by referring to FIG. 11. The 64X clock at 102.4 KHz which is generated by frequency divider 846, is coupled to an input of a 32X rate selector 1120. The 32X rate selector 1120 is preferably a divider which provides selective division by 1 or 2 to generate a sample clock which is thirty-two times the symbol transmission rate. A control signal (1600/3200) is coupled to a second input of the 32X rate selector 1120, and is used to select the sample clock rate for symbol transmission rates of 1600 and 3200 symbols per second. The selected sample clock is coupled to an input of 32X data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate 1X and 2X symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1X and 2X symbol clocks with the recovered data signal. The symbol clock rates generated are best understood from the table below.

| Input Clock (Relative) | Control Input (SPS) | Rate Selector Divide Ratio | Rate Selector Output | 2X Symbol Clock (BPS) | 1X Symbol Clock (BPS) |
|---|---|---|---|---|---|
| 64X | 1600 | by 2 | 32X | 3200 | 1600 |
| 64X | 3200 | by 1 | 64X | 6400 | 3200 |

As shown in the table above, the 1X and 2X symbol clocks are generated 1600, 3200 and 6400 bits per second and are synchronized with the recovered data signal.

Figure 12:
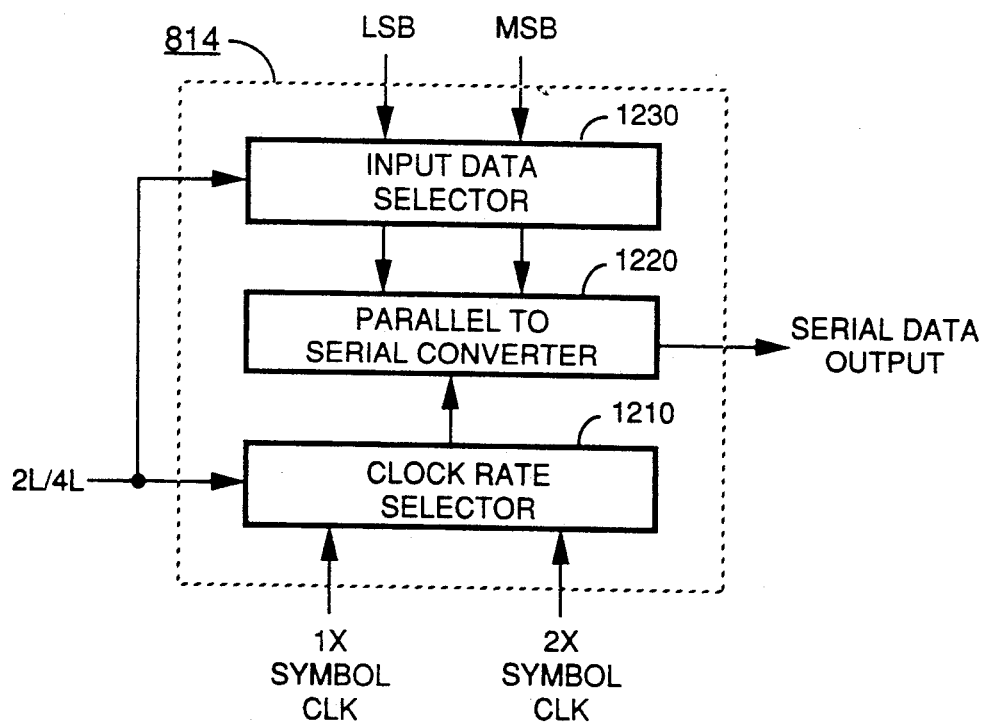
FIG. 12 is an electrical block diagram of a 4-level to binary converter utilized in the data communication receiver of FIG. 8.

The 4-level binary converter 814 is best understood by referring to FIG. 12. The 1X symbol clock is coupled to a first clock input of a clock rate selector 1210. A 2X symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1X clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2X clock input is selected by clock rate selector 1210 which results in a serial two bit binary data stream to be generated at 2X the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator is best understood with reference to FIG. 13. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 13:
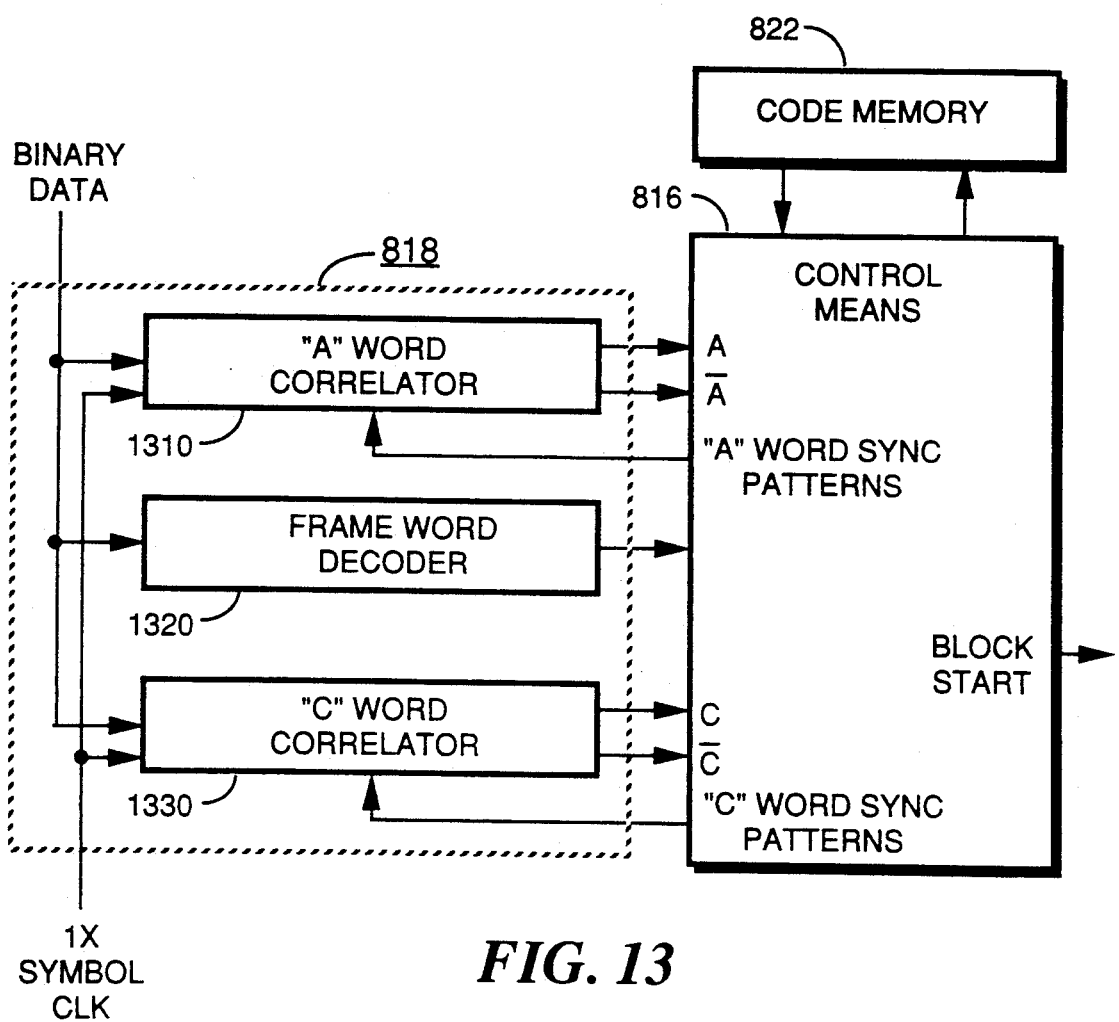
FIG. 13 is an electrical block diagram of a synchronization correlator utilized in the data communication receiver of FIG. 8.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
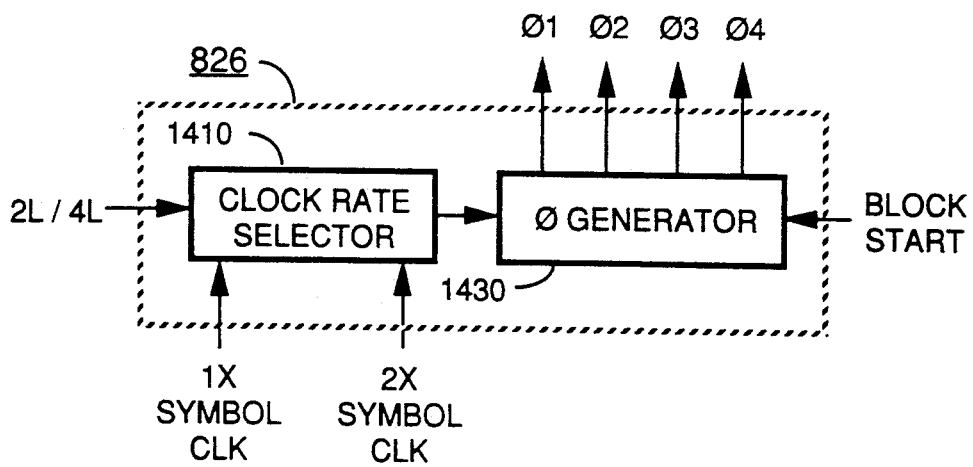
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 14. A control signal (2L/4L) is coupled to an input of clock rate selector 1410 which selects either 1X or 2X symbol clock inputs. The selected symbol clock is coupled to the input of a phase generator 1430 which is preferably a clocked ring counter which is clocked to generate four phase output signals ($\phi 1$–$\phi 4$). A block start signal is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 recovers from the code memory 822, the transmission phase number to which the data communication receiver is assigned. The phase number is transferred to the phase select output ($\phi$ Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an $8 \times 32$ bit array which de-interleaves eight interleaved address, control or message code words, corresponding to one transmission block. The de-interleaved address code words are coupled to the input of address correlator 830. The controller 816 recovers the address patterns assigned to the data communication receiver, and couples the patterns to a second input of the address correlator. When any of the de-interleaved address code words matches any of the address patterns assigned to the data communication receiver within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

Figure 15:
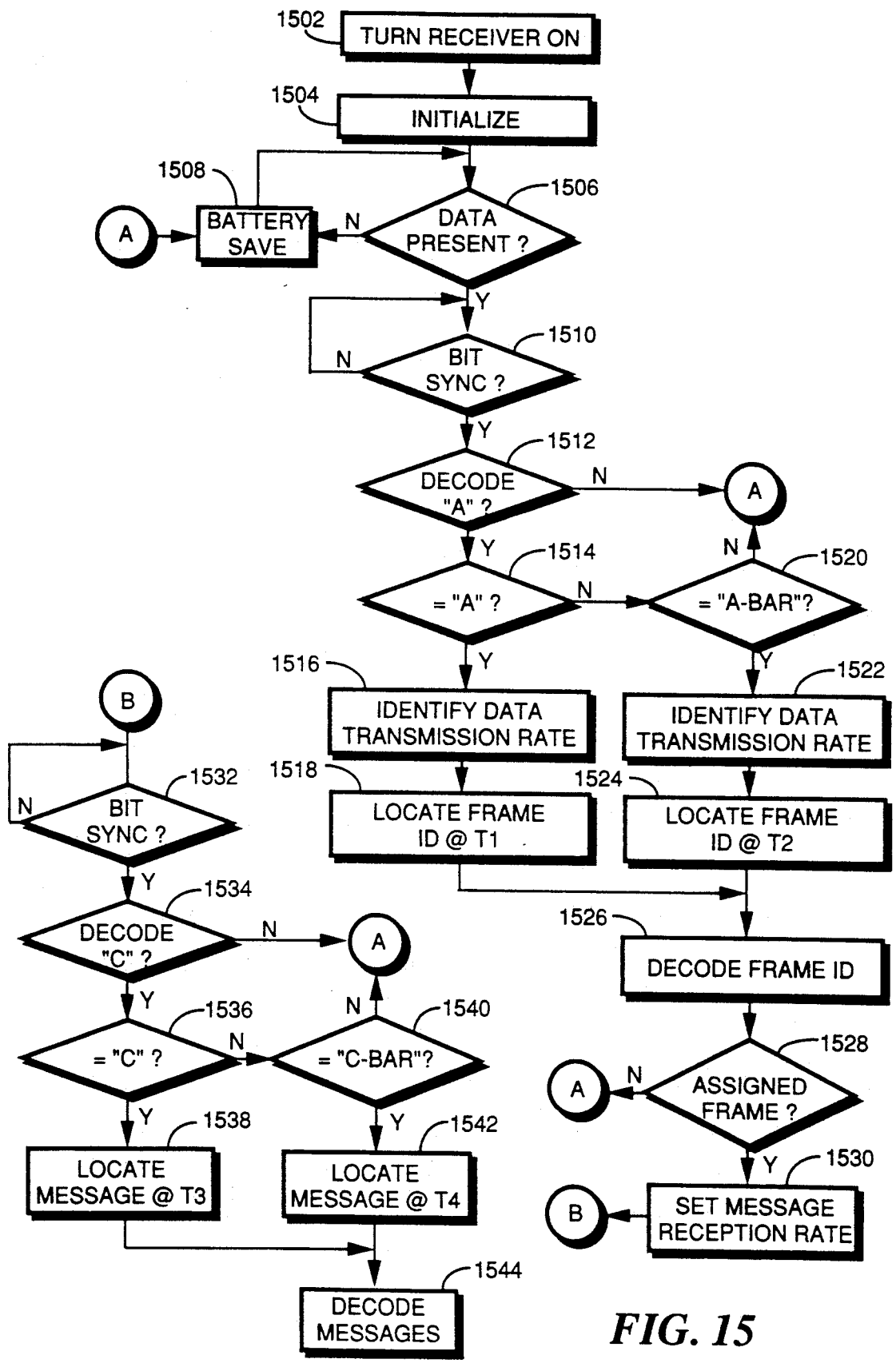
FIG. 15 is a flow chart illustrating the synchronization correlation sequence in accordance with the preferred embodiment of the present invention.

FIG. 15 is a flow chart describing the operation of the data communication receiver in accordance with the preferred embodiment of the present invention. At step 1502, when the data communication receiver is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the time (T1) to the start of the frame identification code word is identified, at step 1518. When the non-complemented "A" word is not detected, at step 1514, indicating the non-complemented "A" word may have been corrupted by a burst error during transmission, a determination is made whether the complemented "A bar" is detected, at step 1520. When the "A bar" word is not detected at step 1512, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1533, the "C" word correlation begins at step 1534. When the non-complemented "C" word is detected, at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C bar" is detected, at step 1540. When the "C bar" word is not detected at step 1540, indicating that the "C-bar" word may also have been corrupted by a burst error during transmission, battery saver operation is again resumed, at step 1508. When the "C-bar" word is detected, at step 1540, frame synchronization is obtained, and the time (T4) to the start of the message information is identified, at step 1542. At the appropriate time, message decoding can begin at step 1544.

In summary, by providing multiple synchronization code words which are spaced in time, the reliability of synchronizing with synchronization information which is subject to burst error corruption is greatly enhanced. The use of a predetermined synchronization code word as the first synchronization code word, and a second predetermined synchronization code word which is the complement of the first predetermined synchronization code word, allows accurate frame synchronization on either the first or the second predetermined synchronization code word. By encoding the synchronization code words, additional information, such as the transmission data rate can be provided, thereby enabling the transmission of message information at several data bit rates. By using a second coded synchronization word pair, "fine" frame synchronization at the actual message transmission rate can be achieved, and again due to spacing in time of the synchronization code words, the reliability of synchronizing at a different data bit rate with synchronization information which is subject to burst error corruption is greatly enhanced, thereby improving the reliability of the data communication receiver to receive and present messages to the receiver user.

Figure 16:
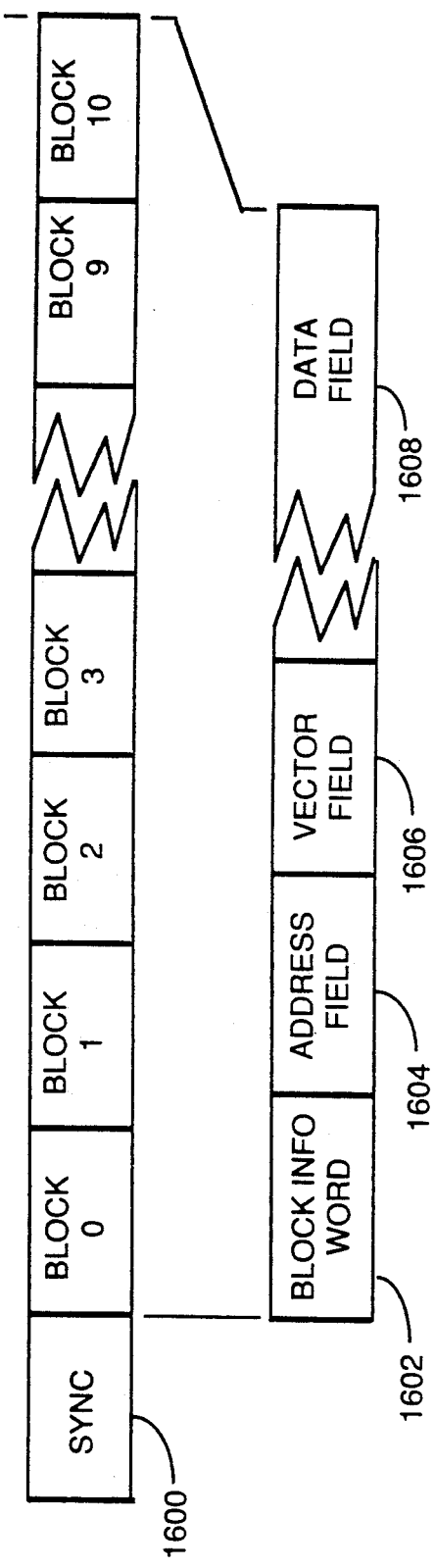
FIG. 16 is a timing diagram illustrating the organization of the transmission frame utilized in accordance with the preferred embodiment of the present invention.

FIG. 16 is a timing diagram illustrating the organization of the transmission frame utilized in accordance with the preferred embodiment of the present invention. As previously described for FIG. 4 and shown again in FIG. 16, the transmission frame comprises a synchronization code word 1600 followed by eleven data blocks labeled Block 0–Block 10. Address, control and message code words are distributed within the eleven data blocks in a predetermined order. The first code word, located in Block 0, is always a block information code word 1602 and includes such information as the beginning locations of an address field 1604 and a vector field 1606, leaving eighty-seven code words available for the transmission of address, vector and data code words. By knowing the beginning location of the address field 1604 and the vector field 1606, the controller is able to calculate how many address code words must be decoded per frame in order to determine when a message is present within the frame. Consequently, the address field 1604 includes one or more address code words corresponding to messages located within a data field 1608. Only address code words specifying numeric and alphanumeric messages have corresponding messages located within the data field 1608. Tone only messages, because no message portion is attached, would not have a corresponding message located within the data field 1608. For those address code words which do have corresponding messages, the vector field 1606 includes control words, or vectors, which define the starting location of messages located within the data field 1608, and there is a one to one correspondence between the address code words located within the address field 1604 and the vectors located within the vector field 1606.

Figure 17:
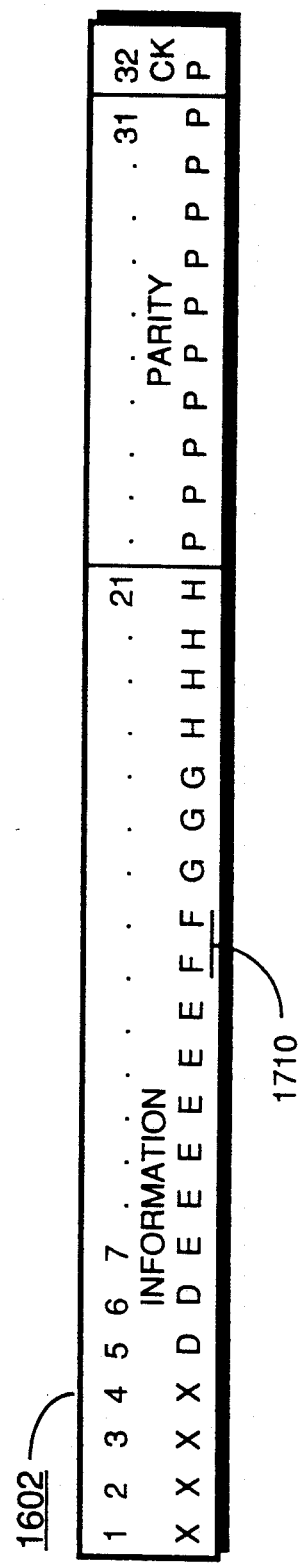
FIG. 17 is a timing diagram illustrating the construction of a control word utilized in accordance with the preferred embodiment of the present invention.

FIG. 17 is a timing diagram illustrating the block information control word 1602 utilized in accordance with the preferred embodiment of the present invention. Two bits define a carry-on flag 1710 and represent the number of carry-on frames which are provided for message transmission. The number of transmission frames into which carry-on is extended is defined by the carry-on flag 1710 as follows:

| Carry-on Flag | Frame Number |
|---|---|
| 00 | Current Frame Only |
| 01 | Thru Frame N + 1 |
| 10 | Thru Frame N + 2 |
| 11 | Thru Frame N + 3 |

The function of the carry-on flag transmitted within the block information word will be described in the description to follow.

Figure 18:
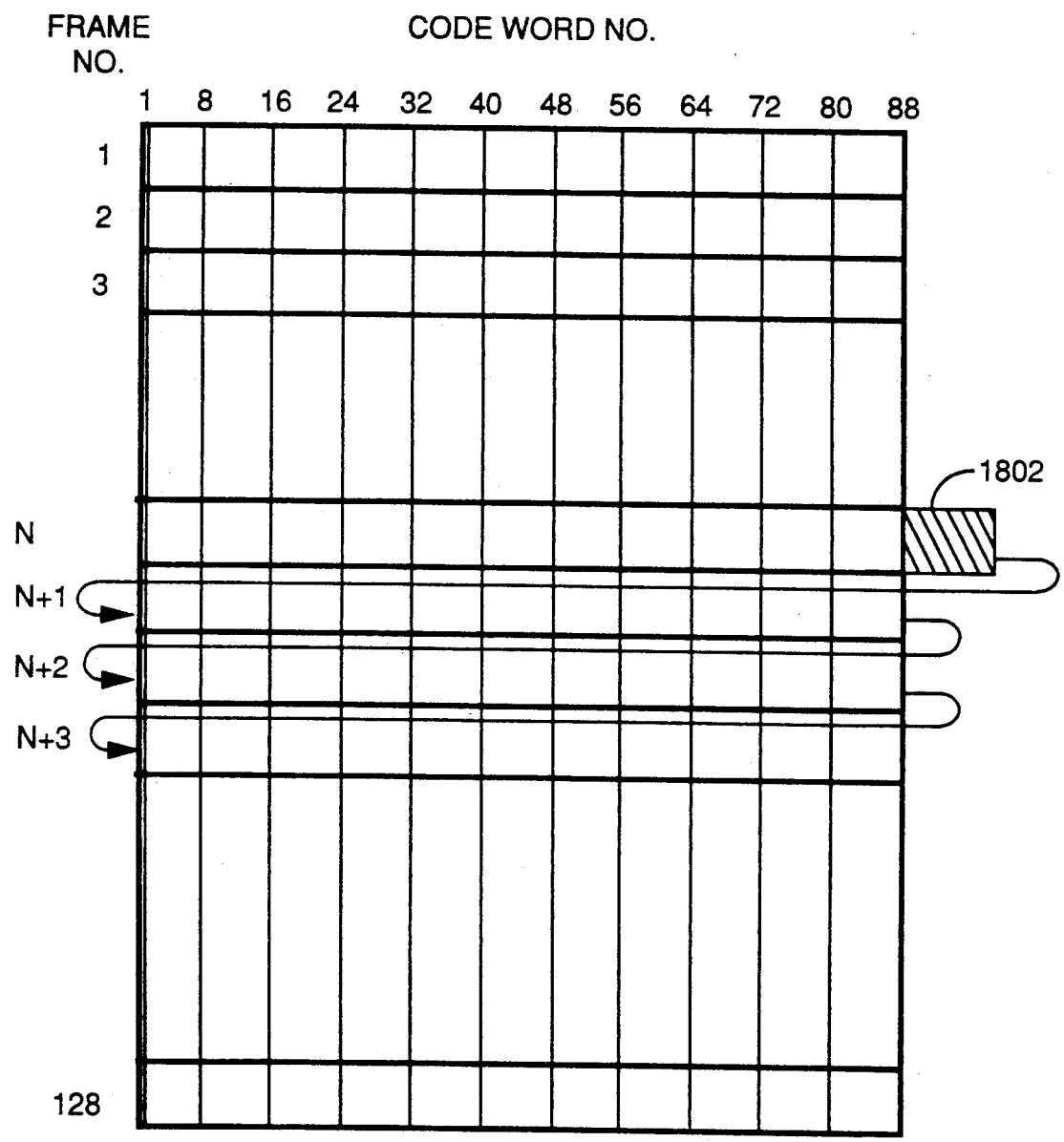
FIG. 18 is a memory map illustrating message carry-on queueing in accordance with the preferred embodiment of the present invention.

FIG. 18 is a memory map illustrating message carry-on in accordance with the preferred embodiment of the present invention. Normally the paging terminal restricts messages which are received over the public switched telephone network (PSTN) to a single transmission frame, which for purposes of example is labeled frame N in FIG. 18. Frame N represents the current transmission frame being processed for message transmission by the controller. As described above, the message data is encoded into eighty-eight code words for transmission during the current transmission frame, of which at least one code word is reserved for the block information code word. It will be appreciated, however, that for any given period of time, the number of messages received by the terminal for transmission, and the length of the messages, can result in a number of code words representing messages received for transmission to exceed the transmission frame queue capacity as illustrated by ann amount represented for purposes of example by excess messages 1802 which extend beyond the transmission frame boundary. Excess messages are defined herein as a complete message with corresponding address, not as a continuation of a single message. When the number of messages received exceeds the frame transmission queue capacity, message carry-on into subsequent transmission frames and message transmission rate changes can be used to increase the number of messages delivered, as will be described below. With message carry-on, the excess messages 1802, are transmitted in one or more of the three subsequent transmission frames, which for purposes of example are labeled N+1, N+2 and N+3. The selection of which transmission frame is utilized is based on determining which of the three subsequent transmission frames has, in one instance, excess transmission frame queue capacity, and in another instance, is one of displacing messages in subsequent transmission frames to allow current messages to be transmitted with the shortest time queue possible, as will be described below.

Figure 19:
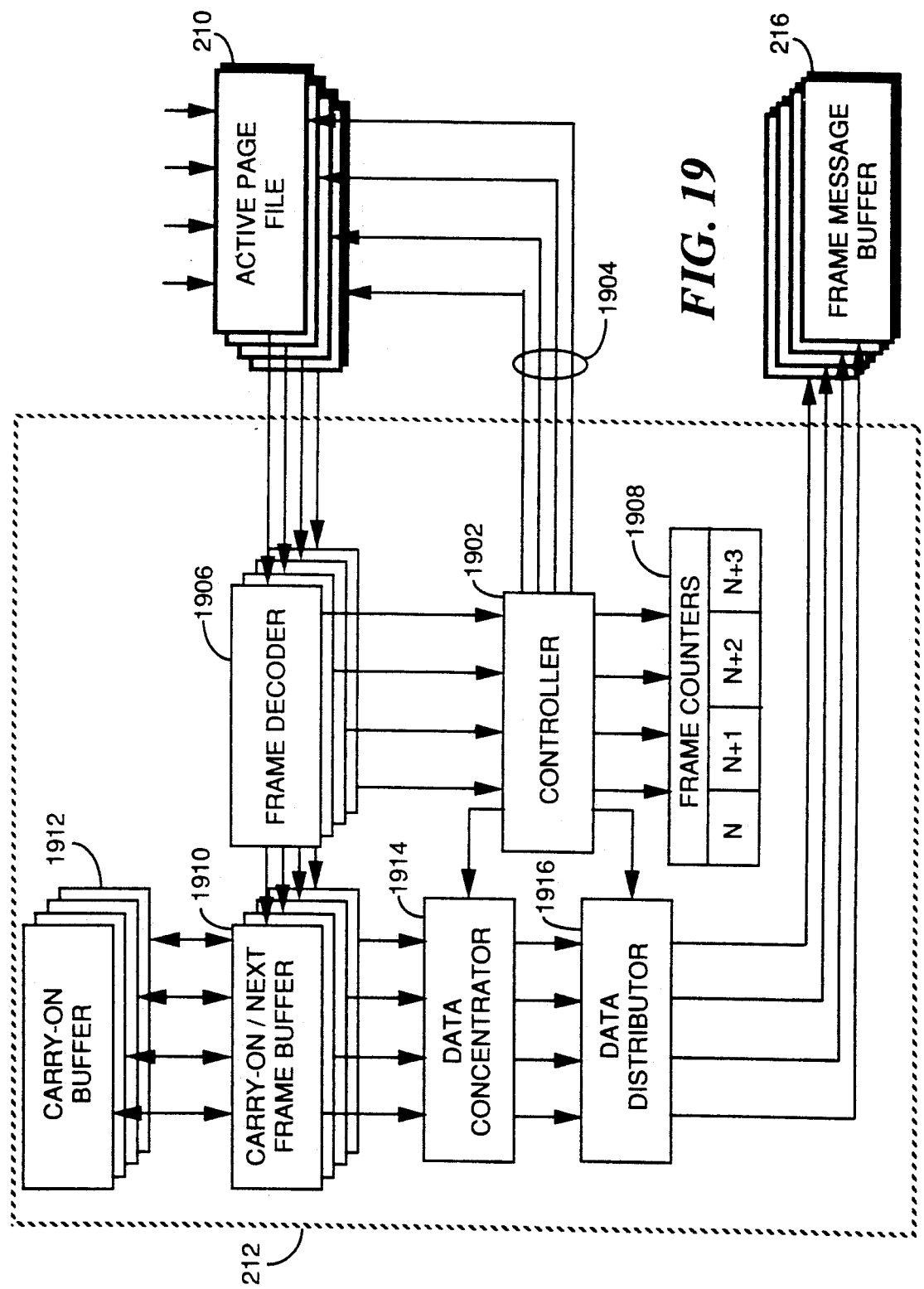
FIG. 19 is an electrical block diagram of a frame formatter utilized in the terminal of FIG. 2.

FIG. 19 is an electrical block diagram of the frame batcher 212 utilized in the controller of FIG. 2. As described above, messages which are received are stored in the active page file 210. The active page file 210 is preferably a dual-port, first-in, first out random access memory which is further delineated by message transmission phase, and which stores the messages in the order in which the messages were received according to the message transmission phase assigned to the data communication receiver. It will be appreciated that other memory types, such as hard disk drives can be utilized as well for implementing the active page file 210.

Periodically, such as once each transmission frame interval, a frame batching controller 1902 having outputs 1904 sequentially accesses the messages stored in the message storage areas representing the message transmission phases of the active page file 210. The recovered messages are coupled to inputs of a frame decoder 1906 which identifies those messages which are to be transmitted during the current transmission frame, and those messages which will be transmitted during one or more subsequent transmission frames, which as described above are the three subsequent transmission frames. When a message is detected within any of the message transmission phases and which are to be transmitted during the current transmission frame, or during one of the three subsequent transmission frames, the frame decoder 1906 generates a message detection signal which is coupled to the frame batching controller 1902. The frame batching controller 1902 then analyzes the corresponding message to determine the number of code words which will be required for message transmission. Depending on the transmission frame assigned to the recovered messages, the frame batching controller 1902 couples calculated message code word counts to a group of frame counters 1908 which maintain a total count of the message code word requirements for the current frame (N), and the three subsequent frames (N+1, N+2 and N+3). The message for the current transmission frame is also stored in a current transmission frame buffer 1910, while messages for the three subsequent transmission frames are returned in the order in which the messages were received to the active page file 210, thereby maintaining message queue order. When the code word count maintained by the frame counter 1908 for the current frame (N) exceeds a predetermined transmission frame queue capacity, which as described above equals eight-seven code words, the excess messages which are detected as the active page file 210 is read out are stored in a carry-on buffer 1912. The excess messages stored in carry-on buffer 1912 will be transmitted in one or more of the three subsequent transmission frames, as will be described below.

After all messages for the current transmission frame have been recovered, the messages stored in the current frame buffer 1910 are coupled to inputs of a data concentrator 1914 which processes the messages stored in the four message storage areas corresponding to transmission phase depending upon the message transmission speed. The concentrated messages are then coupled to inputs of a data distributor 1916 which then distributes the concentrated messages to the frame message buffer 216, again according to the transmission speed. Thereafter, message processing for transmission is as described for FIG. 2.

Figure 20:
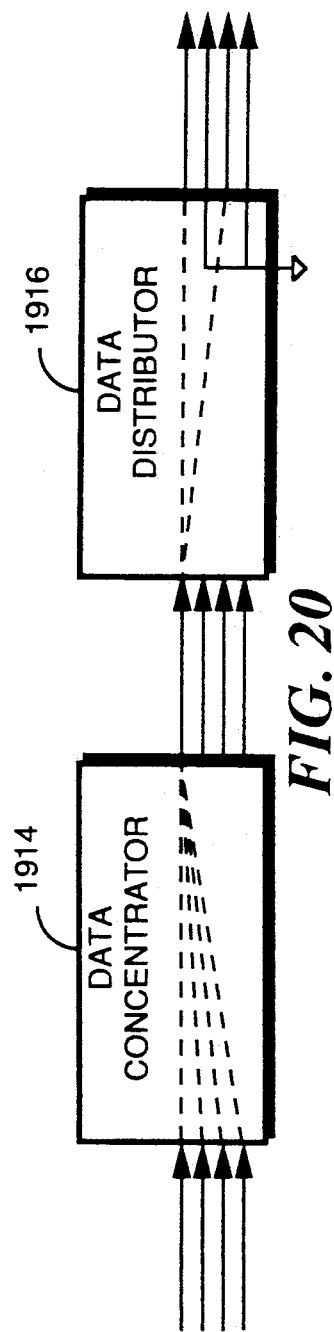
FIGS. 20-22 is an electrical block diagram illustrating the operation of the data concentrator/distributor in accordance with the preferred embodiment of the present invention.
Figure 21:
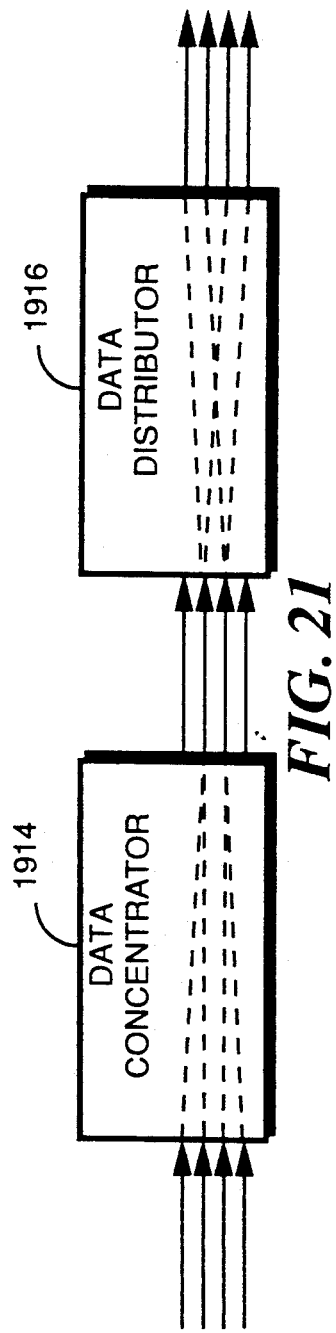
Figure 22:
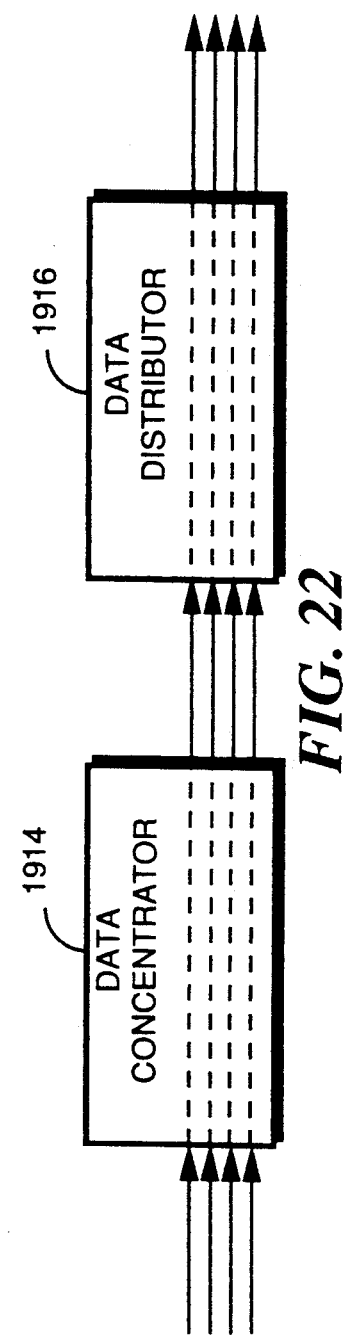

FIGS. 20-22 are electrical block diagrams illustrating the operation of the data concentrator/distributor in accordance with the preferred embodiment of the present invention. The data concentrator 1914 is preferably a programmable four line to one, two or four line de-multiplexer, the operation of which is controlled by the frame batching controller 1902. The data distributor 1916 is preferably a programmable one, two or four line to four line multiplexer, the operation of which is also controlled by the frame batching controller 1902. The operations of both the data concentrator 1914 and the data distributor 1916 are readily implemented as software routines using a microcomputer.

When the message data is to be transmitted at 1600 bits per second (bps), the total number of messages stored within the four transmission phase regions of the current frame buffer is typically eighty-seven or less code words without message carry-on, and typically less than 1.5X to 2X times eighty-seven code words with message carry-on. However, a speed change to the next transmission speed is preferable when the current frame transmission queue exceeds two times eighty-seven code words with message carry-on. As shown in FIG. 20, the contents of the four transmission phases are combined to a single serial output using the data concentrator 1914, and then redistributed to two of the four frame message buffer transmission phases (1 and 3). The second two frame message buffer transmission phases (2 and 4) are coupled to a logic zero by the data distributor 1916 which is then loaded into the frame message buffer. The frame message buffer contents is further processed for transmission as described in FIG. 2 above, and applied to the input of the 4-level FSK modulator at the transmitter, which, because of the logic zero input provided to frame message buffer transmission phases 2 and 4, results in 2-level FSK modulation of the message to be generated at 1600 bps, which also corresponds to a symbol rate of 1600 symbols per second.

When the message data is to be transmitted at 3200 bits per second (bps), the total number of messages stored within the four transmission phase regions of the current frame buffer described above, is typically twice eighty-seven or less code words without message carry-on and typical less than three to four times eighty-seven code words with message carry-on. However, again a speed change to the next transmission speed is preferable when the current frame transmission queue exceeds four times eighty-seven code words with message carry-on. As shown in FIG. 21, the contents of the four transmission phases (1 and 2, and 3 and 4) are combined to two serial outputs (2 and 3) using the data concentrator 1914, and then redistributed to the four frame message buffer transmission phases (1 and 3, and 2 and 4 respectively) by data distributor 1916. The frame message buffer contents is further processed for transmission as described in FIG. 2 above, and applied to the input of the 4-level FSK modulator at the transmitter, which results in 4-level FSK modulation to be generated at 3200 bps, which also corresponds to a symbol rate of 1600 symbols per second.

When the message data is to be transmitted at 6400 bits per second (bps), the total number of messages stored within the four transmission phase regions of the current frame buffer described above, is typically four times eighty-seven or less code words without message carry-on and typically less than six to eight times eighty-seven code words with message carry-on, although message carry-on to sixteen times eighty-seven code words is possible by forcing a carry-on in all three subsequent transmission frames. As shown in FIG. 22, the contents of the four transmission phases are coupled directly through the data concentrator 1914 and the data distributor 1916 to the frame message buffer. The frame message buffer contents is further processed for transmission as described in FIG. 2 above, and applied to the input of the 4-level FSK modulator at the transmitter, which results in 4-level FSK modulation to be generated at 6400 bps which corresponds to a symbol rate of 3200 symbols per second.

In summary, the frame formatter is utilized to sort the messages stored within the active page file, shown in FIG. 2, preparing the messages for transmission. By monitoring the number of code words for which transmission is required in the current transmission frame, and the three subsequent transmission frames, the frame formatter determines when message carry-on is desirable, and which of the three subsequent transmission frames will be used to provide message carry-on. The frame formatter also formats the message data to enable transmission at three selected transmission speeds using preferably a 4-level FSK modulator, thereby providing increased message processing capacity using message carry-on and speed changes to be described below, as the number of messages being received by the system increases.

Figure 23:
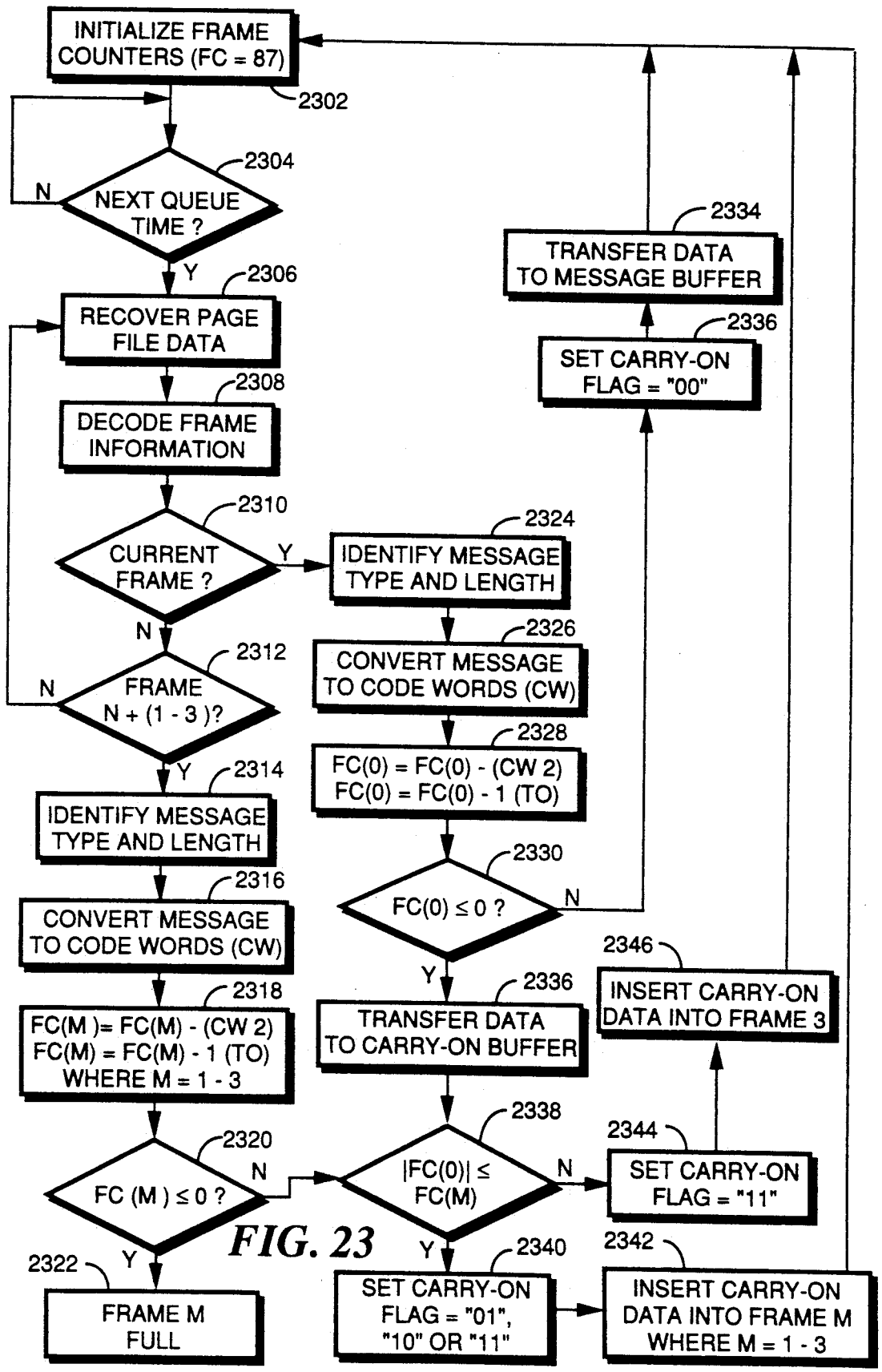
FIG. 23 is a flow chart illustrating the operation of the frame formatter of FIG. 17.

FIG. 23 is a flow chart illustrating the operation of the frame formatter of FIG. 19. At the beginning of each transmission frame processing cycle, the controller within the frame formatter initializes the frame counters to counts of eighty-seven, at step 2302. During the message transmission, the actual number of code words transmitted is eighty-eight which includes at least one block information word followed by the eighty-seven message code words comprising address, control and message information. When the controller determines that it is time to transmit, at step 2304, the contents of the active page file is recovered, at step 2306. As the messages are recovered, the frame information bundled with the corresponding messages is decoded, at step 2308. When the frame information does not belong to the current transmission frame being processed, at step 2310, the controller checks whether the frame information belongs to one of the three subsequent transmission frames, at step 2312. When the frame information indicates the messages do not belong to the three subsequent transmission frames, recovery of the messages from the active page file continues, at step 2306. When the frame information indicates the messages belong to the three subsequent transmission frames, at step 2312, the message type and length are identified, at step 2314. The number of code words required for transmission is next calculated, at step 2316, for each message type, using the table shown below.

| Message Type | Code Words Required for Transmission |
| --- | --- |
| Tone-only | 1 address code word (cw) |
| Numeric (7 digit) | 2 address/vector cw plus 1.4 data cw |
| Numeric (10 digit) | 2 address/vector cw plus 2 data cw |
| Alphanumeric | 2 address/vector cw plus 2 data cw/3 characters |

The table above is based on 21 data bits being available for message transmission in the modified 32,21 BCH code word with numeric characters requiring four data bits and alphanumeric characters requiring seven data bits for message transmission. The frame queue capacity remaining FC(M, where M is 1-3) for the three subsequent transmission frames is next calculated by decrementing the frame counters by the number of code words required per message, at step 2218 following the code word requirement calculation for each message identified to belong to one of the three subsequent transmission frames. When the transmission frame queue capacity is equal to zero (FC(M)=0), at step 2320, the corresponding subsequent transmission frame queue is full, and is not generally suitable in message carry-on, except as will be described below.

When the frame information belongs to the current transmission frame, at step 2310, the message type and length are identified, at step 2324. The number of code words required for message transmission is next calculated, at step 2326, for each message type using the table described above. The transmission frame queue capacity remaining FC(0) for the current transmission frame is next calculated, at step 2328 following the code word requirement calculation for each message. When the current transmission frame queue capacity is not equal to zero (FC(0)>0), at step 2330, and the contents of the active page file memory has been fully recovered, the controller sets the message carry-on flag transmitted in the block information code word to "00", at step 2332, indicating that no message carry-on is required for the current transmission frame. After the block information control word is updated by the controller, the current transmission frame buffer contents is then transferred to the frame message buffer for processing as described in FIG. 2 above.

When the current transmission frame queue is full, at step 2330, any further message requirements are stored in the carry-on buffer, at step 2336. When the contents of the active page file memory has been fully recovered, the absolute value of the contents of the current frame counter is determined, which indicates the actual number of code words which are required to be placed into one or more subsequent transmission frames using message carry-on when the code word count is negative. In one embodiment of the present invention, the number of code words which correspond to complete messages including address, control and message information, which is to be moved from the current transmission frame is then compared to the number of available code word positions within the subsequent three frames, at step 2338. When a sufficient number of code word positions are available in the first, second or third subsequent transmission frame or a combination thereof to accommodate the number of messages to be moved from the current frame, the controller sets the carry-on flag in the block information code word, to "01", "10" or "11" respectively, thereby identifying whether the carry-on information is located within the first, second or third subsequent frame or combination thereof, at step 2342.

When the number of code words required to be carried-on exceeds the number of excess code words available in the three subsequent transmission frames, at step 2338, the carry-on messages are preferably placed at the head of the transmission frame queue for the third subsequent transmission frame, and the carry-on flag is set by the controller to "11", at step 2344, indicating the carry-on information is located in at least the third subsequent transmission frame, at step 2346. It will be appreciated, that by placing the current transmission frame excess code words at the head of the frame transmission queue for the third subsequent transmission frame, the requirement for carry-on within the third subsequent transmission frame is generally insured when messages requirements for that transmission frame are evaluated as the current transmission frame. In the alternative, the excess messages can be transmitted in part in any excess code word positions available in the subsequent three transmission frames, leaving the balance for the next transmission frame cycle, or can replace the messages in any one of the three subsequent transmission frames, such as by "bumping" the messages in the first subsequent transmission frame, and then using message carry-on for each of the subsequent transmission frames until a transmission frame becomes available to absorb the excess message count without the requirement for a message carry-on.

Figure 24:
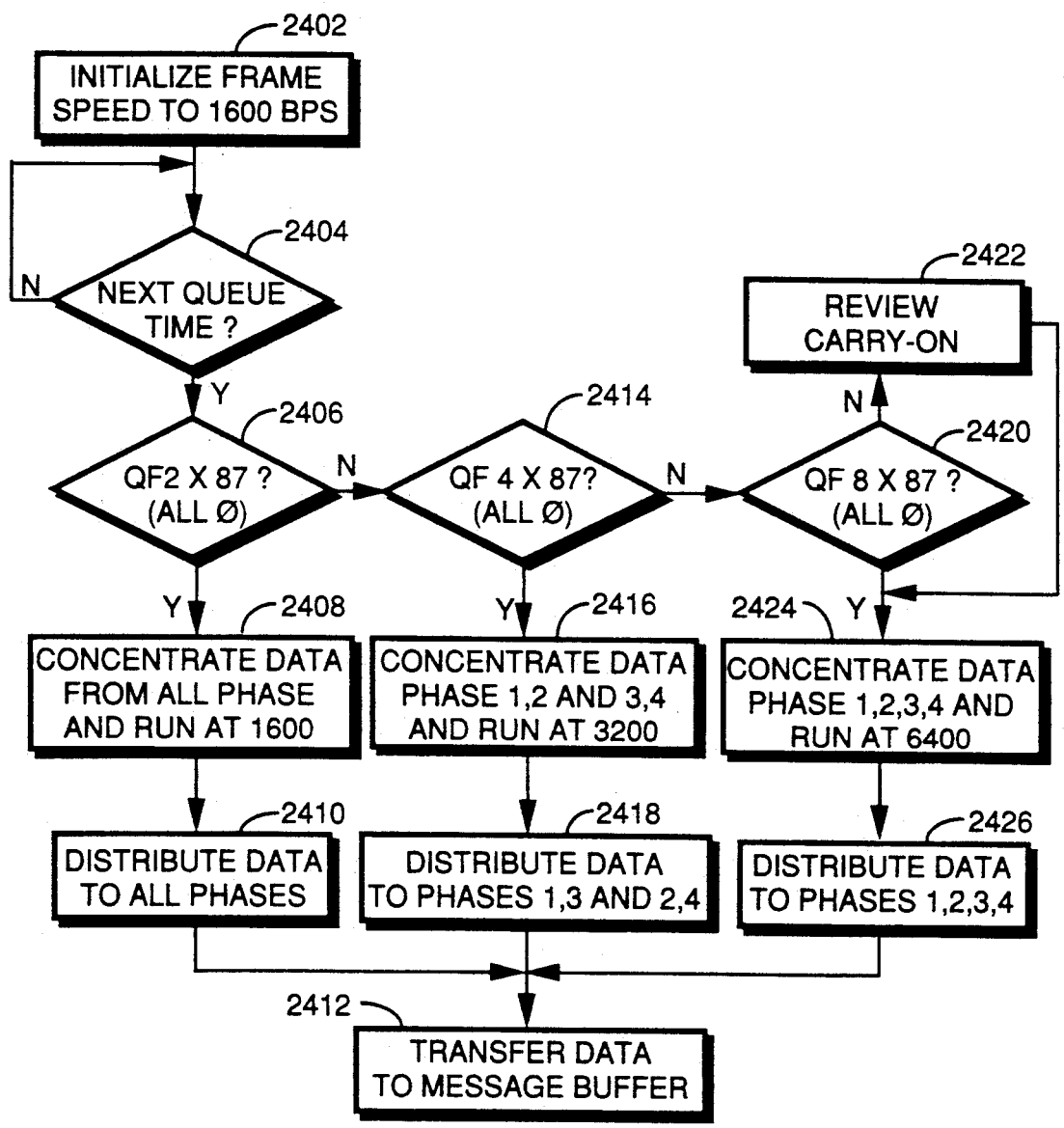
FIG. 24 is a flow chart illustrating data speed selection in accordance with the preferred embodiment of the present invention.

FIG. 24 is a flow chart illustrating data speed selection in accordance with the preferred embodiment of the present invention. At step 2402, the transmission speed is initialized, for purposes of example, to 1600 bits per second (bps), although it will be appreciated that the actual transmission speed could be initialized to 3200 or 6400 bit per second (bps) as well. At the next transmission queue time, at step 2404, the current transmission frame queue capacity is evaluated as described above, at step 2406. When the current transmission frame queue capacity is, for example, less than two times eighty-seven code words, at step 2406, the messages from each transmission phase are concentrated, at step 2408, and redistributed to transmission phases 1 and 3, at step 2410, as described for FIG. 20 above, and transferred to the frame message buffer, at step 2412, resulting in 2-level FSK modulation being generated at a data rate of 1600 symbols per second when the messages are transmitted.

When the current transmission frame queue is, for example, greater than two times eighty-seven code words and less than four times eighty-seven code words, at step 2414, and message carry-on is not invoked, the message code words are concentrated by transmission phase, at step 2416, and then redistributed by transmission phase, at step 2418, as described for FIG. 21 above, and transferred to the frame message buffer, at step 2412, resulting in 4-level FSK modulation being generated at a data rate of 3200 bits per second which corresponds to 1600 symbols per second when the messages are transmitted.

When the current transmission frame queue is, for example, greater than four times eighty-seven code words and less than eight times eighty-seven code words, at step 2420, and message carry-on is not invoked, the message code words are concentrated by transmission phase, at step 2424, and then redistributed by transmission phase, at step 2426, as described for FIG. 22 above, and transferred to the frame message buffer, at step 2312, resulting in 4-level FSK modulation being generated at a data rate of 6400 bits per second which corresponds to 3200 symbols per second when the messages are transmitted.

When the current transmission frame queue is, for example, greater than eight times eighty-seven code words, at step 2420, message carry-on is reviewed, at step 2422, in an attempt to transmit all messages in the transmission frame queue during the current transmission frame cycle.

While carry-on considerations are not considered while speed change decisions were described in FIG. 24, it is clear that when messages can be delivered in most transmission frames, at a given transmission speed, message carry-on can be used effectively to balance those transmission frames which have a greater number of messages to be transmitted than can be effectively handled within the transmission frame at an increased transmission speed. When frame transmission queue requirements increase generally throughout the active page file due to an increased number of messages being received for all transmission frames, the use of transmission speed changes are effective in increasing the level of traffic that can be handled on the channel. By balancing the use of transmission frame carry-on and speed changing, a true variable speed signaling format is provided which allows flexible system growth beginning at a relatively low message transmission speed and progressing to a relatively high message transmission speed. While an increased number of data communication receivers can be added, and while message transmission speed is increased by transmitting multiple messages essentially in parallel, as described above, the actual decoding speed requirement for the data communication receivers remains constant for the transmission protocol as described the message speed increases, also as described above.

A data communication receiver, in normal operation, decodes address information present in the transmission frame assigned, and when an address is detected which corresponds to the data communication receiver, will also decode the message information corresponding thereto. However, when so indicated by the message carry-on flag transmitted within the block information code word, the data communication receiver will also decode address information present in one or more of up to three subsequent transmission frames, and when an address is detected within the assigned transmission frame or within one of the three subsequent transmission frames, as indicated by the received message carry-on flag, and which is assigned to the data communication receiver, will also decode the message information corresponding thereto, thereby ensuring message delivery in the shortest period of time.

We claim:

1. A data communication terminal for transmitting messages to a plurality of data communication receivers, the data communication terminal having an input for receiving messages and assigning the same into a plurality of transmission frames which are assigned for transmission to the plurality data communication receivers, said data communication terminal comprising:

first memory means for storing the received messages;

timing means for generating periodic timing signals;

means responsive to the periodic timing signals, for recovering the stored messages and queueing the same into a second memory means having a predetermined transmission frame queue capacity;

means for monitoring the transmission frame queue capacity of said second memory means, and expected transmission frame queue capacities for one or more subsequent transmission frames, said monitoring means determining when the messages stored within said second memory means will exceed the predetermined transmission frame queue capacity, and for storing the excess messages in a third memory means;

means, responsive to said monitoring means, for generating designating information designating one or more of the subsequent transmission frames during which the excess messages stored are to be transmitted; and means for transmitting the messages and designating information stored in said second memory means within the assigned transmission frame, and for transmitting the excess messages stored in said third memory means within the one or more of the subsequent transmission frames designated by the designating information.

2. The data communication terminal according to claim 1, wherein said means for recovering and queueing comprises:

controller means for controlling the recovery of the stored messages during the assigned transmission frame;

decoding means for decoding the transmission frame assignment information to enable queueing the messages for the assigned transmission frame.

3. The data communication terminal according to claim 2, wherein the data communication receivers are assigned to one of a plurality of message transmission phases, and said first memory means comprises a plurality of message storage areas corresponding to the message transmission phases, wherein the messages are stored in the message storage area corresponding to the assigned message transmission phase.

4. The data communication terminal according to claim 2, wherein said first memory means is a dual-port first-in, first-out random access memory.

5. The data communication terminal according to claim 2, wherein said monitoring means comprises:

first means, coupled to said controller means, for counting the messages recovered for the assigned transmission frame; and second means, coupled to said controller means, for counting the messages recovered for the one or more subsequent transmission frames.

6. The data communication terminal according to claim 5, wherein said first and second means for counting generate counts representative of the received message length.

7. The data communication terminal according to claim 6, wherein said controller means further comprises means for detecting when the first and second counts generated by said first and second counting means exceed a count corresponding to the predetermined transmission frame queue capacity.

8. The data communication terminal according to claim 1 wherein the messages stored in said third memory means are transmitted in one or more subsequent transmission frames having unused queue capacity.

9. The data communication terminal according to claim 1 wherein the messages stored in said third memory means are transmitted in a selected one of the subsequent transmission frames.

10. The data communication terminal according to claim 1 wherein said second memory means is a partition of said first memory means.

11. The data communication terminal according to claim 1 wherein said third memory means is a partition of said second memory means.

12. A method for queueing messages for transmission in a data communication terminal having an input for receiving messages and for assigning the same into a plurality of transmission frames assigned for transmission to a plurality of data communication receivers, said method comprising the steps of:

storing the received messages in a first memory area;
generating periodic timing signals;
recovering the stored messages from the first memory in response to the periodic timing signals being generated;
queueing the recovered messages for the assigned transmission frame into a second memory area having a predetermined queue capacity;
monitoring the second memory queue capacity, and expected queue capacities for one or more subsequent transmission frames;
determining when the messages stored within the second memory area exceed the predetermined queue capacity;
storing the excess messages recovered in a third memory area;
generating designating information designating one or more subsequent transmission frames during which the excess messages stored in the third memory area are to be transmitted; and
transmitting the messages and designating information stored in the second memory area within the assigned transmission frame; and
transmitting the excess messages stored in the third memory area within the one or more subsequent transmission frames designated by the designating information.

13. The method for queueing messages according to claim 12, further comprising the step of decoding the transmission frame assignment information enables queueing the messages in the second memory for the assigned transmission frame.

14. The method for queueing messages according to claim 13, wherein the step of decoding the transmission frame assignment information further enables monitoring the expected queue capacities in the one or more subsequent transmission frames.

15. The method for queueing messages according to claim 12, wherein the data communication receivers are assigned to one of a plurality of message transmission phases, and first memory comprises a plurality of message storage areas representing message transmission phases, and wherein said method further comprises the step of storing the messages into the message storage area corresponding to the assigned message transmission phase.

16. The method for queueing messages according to claim 12, wherein said step of monitoring comprises the steps of:

generating a first count of the messages recovered for transmission in the assigned transmission frame; and
generating a second count of the messages recovered for transmission in the one or more subsequent transmission frames.

17. The method for queueing messages according to claim 16, further comprising the steps of:

detecting when the first and second counts generated exceed a count corresponding to the predetermined transmission frame queue capacity.

18. The method for queueing messages according to claim 12, wherein said step of transmitting the messages stored in the third memory area, transmits the messages in one or more subsequent transmission frames having unused queue capacity.

19. The method for queueing messages according to claim 12, wherein said step of transmitting the messages stored in the third memory area, transmits the messages in a selected one of the subsequent transmission frames.

* * * * *

UNITED STATES PATENT AND TRADEMARK OFFICE
CERTIFICATE OF CORRECTION

PATENT NO. : 5,282,205

DATED : January 25, 1994

INVENTOR(S) : Kuznicki, et al.

It is certified that error appears in the above-identified patent and that said Letters Patent is hereby corrected as shown below:

On the cover page, item (75) Inventor:, please add

--Robert J. Schwendeman, Pompano Beach, Fla.--

Item [19] should read "Kunznicki et al"

Signed and Sealed this

Twenty-first Day of February, 1995

Attest:

BRUCE LEHMAN

Attesting Officer

Commissioner of Patents and Trademarks